US011880683B2

(12) United States Patent
Chen et al.

(10) Patent No.: US 11,880,683 B2
(45) Date of Patent: Jan. 23, 2024

(54) PACKED 16 BITS INSTRUCTION PIPELINE

(71) Applicant: Advanced Micro Devices, Inc., Sunnyvale, CA (US)

(72) Inventors: Jiasheng Chen, Orlando, FL (US); Bin He, Oviedo, FL (US); Yunxiao Zou, Shanghai (CN); Michael J. Mantor, Orlando, FL (US); Radhakrishna Giduthuri, Campbell, CA (US); Eric J. Finger, Brea, CA (US); Brian D. Emberling, Palo Alto, CA (US)

(73) Assignee: Advanced micro devices, inc., Santa Clara, CA (US)

( * ) Notice: Subject to any disclaimer, the term of this patent is extended or adjusted under 35 U.S.C. 154(b) by 0 days.

(21) Appl. No.: 15/799,560

(22) Filed: Oct. 31, 2017

(65) Prior Publication Data

US 2019/0129718 A1     May 2, 2019

(51) Int. Cl.
*G06F 9/30* (2018.01)
*G06F 7/483* (2006.01)
*G06F 7/57* (2006.01)

(52) U.S. Cl.
CPC .......... *G06F 9/30014* (2013.01); *G06F 7/483* (2013.01); *G06F 7/57* (2013.01); *G06F 9/30036* (2013.01); *G06F 9/30112* (2013.01); *G06F 2207/3812* (2013.01); *G06F 2207/3828* (2013.01)

(58) Field of Classification Search
CPC .................. G06F 9/30014; G06F 9/30036
See application file for complete search history.

(56) References Cited

U.S. PATENT DOCUMENTS

| 5,293,631 | A | 3/1994 | Rau et al. |
|---|---|---|---|
| 5,590,352 | A | 12/1996 | Zuraski, Jr. et al. |
| 6,223,277 | B1 * | 4/2001 | Karguth ............. G06F 9/30014 |
| | | | 712/200 |
| 7,543,119 | B2 | 6/2009 | Hessel et al. |
| 8,555,034 | B2 | 10/2013 | Damron |
| 2004/0216094 | A1 | 10/2004 | Bosworth et al. |
| 2007/0192396 | A1 * | 8/2007 | Pedersen ................ G06F 7/505 |
| | | | 708/505 |
| 2008/0127059 | A1 | 5/2008 | Eichenberger et al. |
| 2008/0141012 | A1 | 6/2008 | Yehia et al. |
| 2008/0288754 | A1 | 11/2008 | Gonion et al. |

(Continued)

*Primary Examiner* — Eric Coleman
(74) *Attorney, Agent, or Firm* — Kowert, Hood, Munyon, Rankin & Goetzel, P.C.; Rory D. Rankin

(57) ABSTRACT

Systems, apparatuses, and methods for efficiently processing arithmetic operations are disclosed. A computing system includes a processor capable of executing single precision mathematical instructions on data sizes of M bits and half precision mathematical instructions on data sizes of N bits, which is less than M bits. At least two source operands with M bits indicated by a received instruction are read from a register file. If the instruction is a packed math instruction, at least a first source operand with a size of N bits less than M bits is selected from either a high portion or a low portion of one of the at least two source operands read from the register file. The instruction includes fields storing bits, each bit indicating the high portion or the low portion of a given source operand associated with a register identifier specified elsewhere in the instruction.

20 Claims, 9 Drawing Sheets

(56) References Cited

U.S. PATENT DOCUMENTS

| | | |
|---|---|---|
| 2009/0300323 A1 | 12/2009 | Hessel et al. |
| 2011/0307226 A1* | 12/2011 | Liu ..................... H03M 7/30 |
| | | 703/2 |
| 2011/0320765 A1 | 12/2011 | Karkhanis et al. |
| 2013/0086565 A1 | 4/2013 | Gaster et al. |
| 2014/0188965 A1* | 7/2014 | Iacobovici ............ G06F 7/72 |
| | | 708/491 |

* cited by examiner

PACKED 16 BITS INSTRUCTION PIPELINE

BACKGROUND

Description of the Related Art

Multiple choices in precision exist for arithmetic operations for a variety of applications. For example, quadruple-, double-, single-, and half-precision arithmetic operations are available. Many high-performance system designers and users are interested in the metric floating point operations per second (FLOPS), which is believed to be a better performance metric than measuring instructions per second. Although higher performance processors and accelerators are developed, such as for quadruple- and double-precision applications, there are both current and even new applications developing that benefit from lower precision computing.

Deep learning training and operation, such as neural network training, radio astronomy, sensor data and many image processing applications benefit more from processing relatively high volumes of single- or half-precision data than processing quadruple- or double-precision mathematical operations at a high rate. Using less precision is not only sufficient, but also using a less precision data format for floating-point operations occupies less storage space, consumes less memory bandwidth and in many cases, provides higher performance than higher precision data formats.

Processing applications using less precision data formats on hardware resources, which also support higher precision data formats, means the hardware resources are inefficiently used. In such cases, no additional performance benefits are obtained even though power consumption increases.

In view of the above, efficient methods and systems for processing arithmetic operations are desired.

BRIEF DESCRIPTION OF THE DRAWINGS

The advantages of the methods and mechanisms described herein may be better understood by referring to the following description in conjunction with the accompanying drawings, in which.

Figure 1:
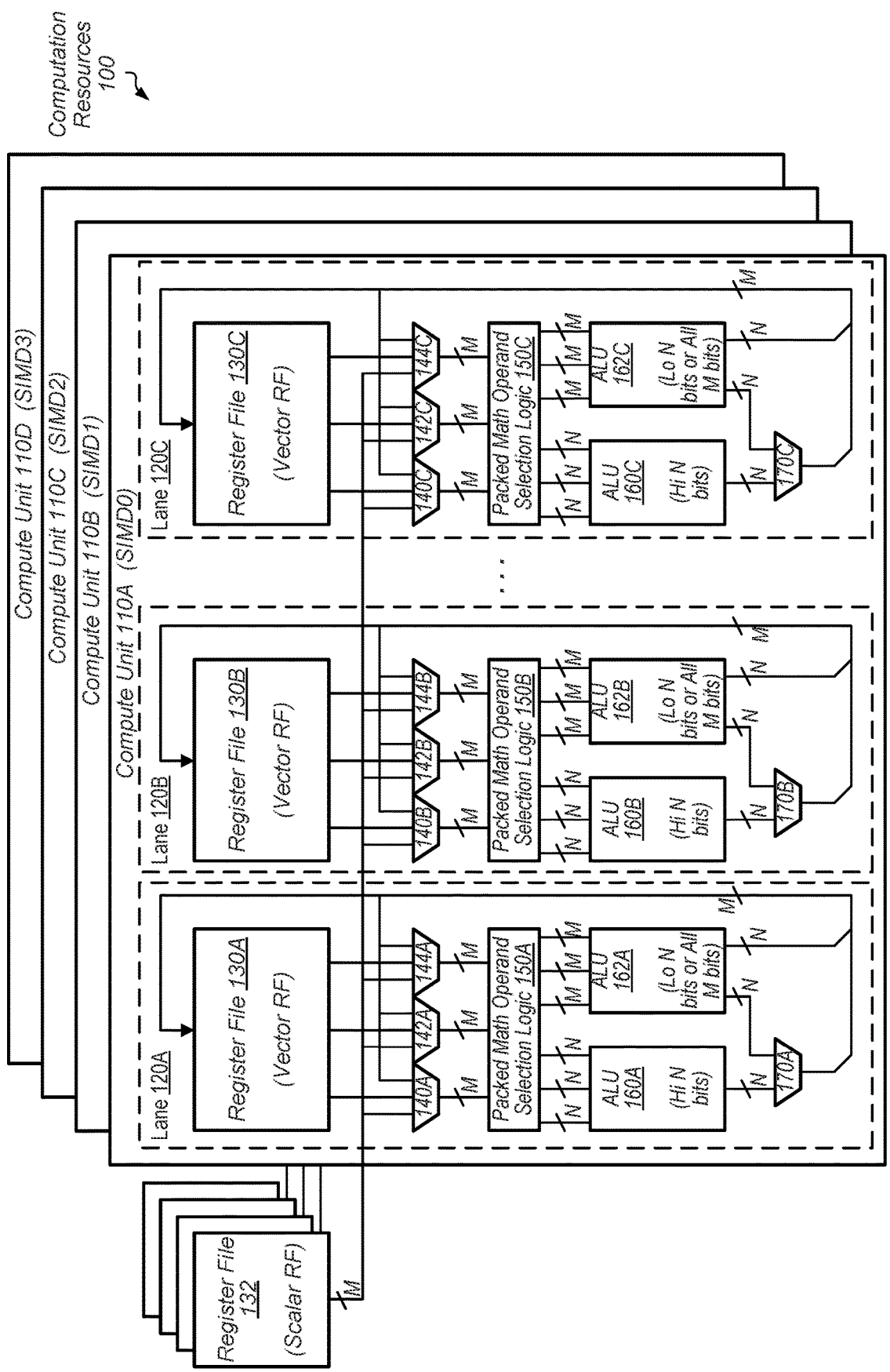
FIG. 1 is a block diagram of one embodiment of compute resources.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficiently processing arithmetic operations are disclosed. In various embodiments, a computing system includes a processor capable of executing operations of multiple data sizes. For example, in an embodiment, the process executes mathematical instructions with single precision performed on operands with M bits. Here, M is a non-zero integer. In one embodiment, single precision instructions have a data size of 32 bits. The processor also executes instructions of half precision performed on operands with N bits. Here, N is a non-zero integer less than M. Therefore, the data size for half precision operands is less than the data size for single precision operands. In one embodiment, half precision instructions have a data size of 16 bits.

In various embodiments, the processor includes at least two arithmetic logic units (ALUs). Each of the ALUs includes multiple components for performing particular operations such as multiply, addition, rounding and so forth. In some embodiments, the at least two ALUs simultaneously execute operations of N bits. The processor includes at least one register file for storing data. In an embodiment, each addressable data has a size of M bits. For example, each operand stored in the register file and identified by a register identifier in a particular field of a received instruction has a size of M bits.

Control logic in the processor is implemented by hardware, software or a combination of hardware and software. The control logic reads, from the register file, at least two source operands indicated by the received instruction. Each source operand has a size of M bits. The control logic also determines whether the instruction is a packed math instruction. If so, the control logic selects at least a first source operand with a size of N bits, where N is less then M, from either a high portion or a low portion of one of the at least two source operands read from the register file. In some embodiments, the control logic selects each of multiple source operands needed by the packed math operation from either a high portion or a low portion of one of the at least two source operands read from the register file. Each of the multiple source operands has the size of N bits. In an embodiment, the instruction includes fields storing bits, each bit indicating the high portion or the low portion of a given source operand associated with a register identifier specified elsewhere in the instruction.

The control logic sends the one or more source operands of the packed math instruction to the at least two ALUs. Additionally, the control logic sends an indication to the at least two ALUs specifying the packed math operation indicated by the received instruction so that the two ALUs perform the packed math operation on the data of the source operands with a size of N bits. In some embodiments, the control logic determines from the first instruction that a negative value of at least the first source operand is needed for the packed math operation. In various embodiments, multiple source operands have negative values. For example, a negative value can be applied to any and all of the source operands. In an embodiment, the instruction includes fields storing bits, each bit indicating whether a negative value is needed for a given source operand associated with a register identifier specified elsewhere in the instruction.

In some embodiments, the control logic determines whether the instruction is a repacking instruction. If so, the control logic selects a first source operand with the size of N bits, where N is less than M. The first N-bit source operand is selected from either a high portion or a low portion of one of the at least two M-bit source operands read from the register file. In addition, the control logic selects a second N-bit source operand. The second N-bit source operand is selected from either a high portion or a low portion of one of the at least two M-bit source operands read from the register file. The control logic inserts the first N-bit source operand in either a high portion or a low portion of an M-bit destination register and inserts the second N-bit source operand in the high portion or the low portion of the M-bit destination register different from the portion storing the first N-bit source operand.

In some embodiments, the control logic determines whether the instruction is a mixed precision instruction. If so, and the control logic determines that an indication in the received instruction specifies a first source operand as a half precision operand, then the control logic selects an N-bit source operand from either a high portion or a low portion of one of the at least two M-bit source operands read from the register file. Following, the control logic sends the selected N-bit source operand to one of the first ALU and the second ALU. In some embodiments, the mixed precision instruction includes multiple half precision operands. For each half precision operand of the multiple half precision operands, the control logic selects data from either a high portion or a low portion of one of the at least two M-bit source operands read from the register file.

Turning now to FIG. 1, a generalized block diagram of one embodiment of computation resources 100 is shown. In the illustrated embodiment, the computation resources 100 includes the multiple compute units 110A-110D, each with multiple lanes 120A-120C. Each lane is also referred to as a single instruction multiple data (SIMD) unit or a SIMD lane. The components in lanes 120A-120C operate in lockstep. In an embodiment, each of the lanes 120A-120C includes a respective register file such as register files 130A-130C for storing operand data for operations. In one embodiment, the lanes 120A-120C also share the register file 132.

In some embodiments, each of the register files 130A-130C is a vector register file for storing operands for vector operations and register file 132 is a scalar register file for storing operands for scalar operations. Scalar data values are common to each work item in a wavefront. In other words, a scalar data operand is used by each of the lanes 120A-120C at a same time. In contrast, a vector data operand is a unique per work item value, so each of the lanes 120A-120C do not work on a same copy of the vector data operand. In one embodiment, one or more instructions use vector data operands and generate a scalar result. Therefore, although not shown, the result data from mux gates 170A-170C is also routed to register 132 in some embodiments.

The multiplexers, or mux gates, 140A-144A in lane 120A are used to provide source operand data for up to three source operands to the packed math operand selection logic 150A. In an embodiment, the three sources for the operand data include the register file 130A, the register file 132 and bypass result data from mux gate 170A. In various embodiments, mux gates 140B-144B in lane 120B and mux gates 140C-144C in lane 120C provide operand data in a similar manner to the packed math operand selection logic 150B and packed math operand selection logic 150C. The packed math operand selection logic may also be referred to as selection logic. As shown, the size of the operand data is M bits. The value M is a non-zero integer. In an embodiment, M is 32, so each of the source operands read from the register files 130A-130C and 132 has a data size of 32 bits. In other embodiments, M is another non-zero integer.

As shown, the selection logic 150A sends source operands with a data size of N bits to the arithmetic logic unit (ALU) 160A while sending source operands with a data size of M bits to the ALU 162A. The value N is a non-zero integer less than M. In an embodiment, N is 16, so each of the source operands sent from selection logic 150A to the ALU 160A has a data size of 16 bits. In some embodiments, ALU 160A operates on operands with single data size of N bits while ALU 162A operates on operands with either a data size of N bits or a data size of M bits. Therefore, lane 120A is capable of operating on one M-bit operation at a time, or alternatively, lane 120A is capable of operating on at least two N-bit operations at a time.

When lane 120A executes a single M-bit operation, ALU 162A is selected for execution. In addition, mux gate 170A selects the N result bits from ALU 162A to concatenate with the other N result bits from ALU 162A to send as M-bit result data for a single M-bit operation to mux gates 140A-144A and register file 130A. When lane 120A executes two N-bit operations, each of ALU 160A and ALU 162A is selected for execution. In addition, mux gate 170A selects the N result bits from ALU 160A to concatenate with the other N result bits from ALU 162A to send as M-bit result data for two N-bit operations to mux gates 140A-144A and register file 130A. Lanes 120B-120C, selection logic 150B-150C, ALUs 160B-162B and 160C-162C, and mux gates 170B-170C operate in a similar manner.

In various embodiments, each of the lanes 120A-120C is organized as multi-stage pipelines. Intermediate sequential elements, such a staging flip-flops, registers or latches, are not shown for ease of illustration. In some embodiments, each of the lanes 120A-120C operate independently from one another. The lanes 120A-120C operate in parallel on streams of floating-point or integer data. In some embodiments, the computations performed in the lanes 120A-120C are made conditional. Additionally, the result data written to register files 130A-130C and 132 and external memory is also made conditional.

In one embodiment, the computation resources 100 are used in a graphics processing unit (GPU). Modern GPUs are efficient for data parallel computing found within loops of applications, such as in applications for computer and mobile device display graphics, molecular dynamics simulations, deep learning training, finance computations, and so forth. The highly parallel structure of GPUs makes them more effective than general-purpose central processing units (CPUs) for a range of complex algorithms.

In some embodiments, each of the N-bit operations is a mathematical operation. In various embodiments, each of the two N-bit operations are included in a single instruction. In an embodiment, the single instruction is referred to as a packed math instruction. A further description of the packed math instruction is provided shortly below. The mathematical operation may be one of a variety of mathematical operations such as integer mathematical operations, Boolean bit-wise operations and floating-point mathematical operations. When the packed math instruction is processed by lane 120A, the same mathematical operation is performed by each of the two ALUs 160A-162A.

Although three M-bit data operands and three N-bit source operands are shown, in other embodiments, another number of M-bit data operands and N-bit source operands are used. The N-bit source operands sent from selection logic 150A to the two ALUs 160A-162A are from a segment of one of the three M-bit data operands received by selection logic 150A. In various embodiments, the segment within the M-bit data operands is either a high portion or a low portion of the M-bit data operand. For example, when M is 32 and N is 16, the 16-bit source operands sent from selection logic 150A to ALUs 160A-162A are from either a high half or a low half of one of the 32-bit data operands received by selection logic 150A. In the illustrated embodiment, the two 16-bit result data (one from ALU 160A and one from ALU 162A) are written back to a single 32-bit vector register in the vector register file 130A. In some embodiments, one or more 32-bit destination registers are used to stage the result data in a pipeline before the 32-bit result data is written into register file 130A.

The two N-bit operations generated by the single packed math instruction are executed by ALUs 160A-162A as if they were separate threads. For example, in one embodiment, a packed math ADD instruction with M equal to 32 and N equal to 16 may have a destination register identifier equal to V0 and two source operands identifiers equal to V1 and V2 (e.g., V0=V1+V2). Two separate ADD instructions are executed with one executed by ALU 160A and the other executed by ALU 162A. In one embodiment, ALU 160A performs the operation V0[15:0]=V1[15:0]+V2[31:16] while ALU 162A performs the operation V0[31:16]=V1[31:16]+V2[15:0]. Other combinations of portions of the M-bit data operand used by the single packed math instruction for processing multiple N-bit operations are possible and contemplated.

The processing of packed math instructions, which includes the processing of at least two N-bit operations, increases throughput, reduces the non-use of hardware resources of performing N-bit operations on M-bit hardware and reduces the amount of storage in the register files for data operands. For many algorithms for computer and mobile device display graphics, molecular dynamics simulations, deep learning training, and so forth, half precision mathematical operations provide sufficient accuracy.

In an embodiment, the single packed math instruction includes information in the instruction format used by at least the packed math operand selection logic 150A-150C and mux gates 170A-170C. In some embodiments, the M-bit mathematical operation, which is processed one at a time, is a single-precision mathematical operation. In some embodiments, each of the at least two N-bit mathematical operations, which are processed at a same time, is a half-precision mathematical operation. In an embodiment, processing at the same time refers to processing in a same clock cycle.

In some embodiments, the functionality of the computation resources 100 is included as components on a single die, such as a single integrated circuit. In other embodiments, the functionality of the computation resources 100 is included as multiple dies on a system-on-a-chip (SOC). In various embodiments, the computation resources 100 is used in a desktop, a portable computer, a tablet computer, a smartwatch, a smartphone, or other.

Figure 2:
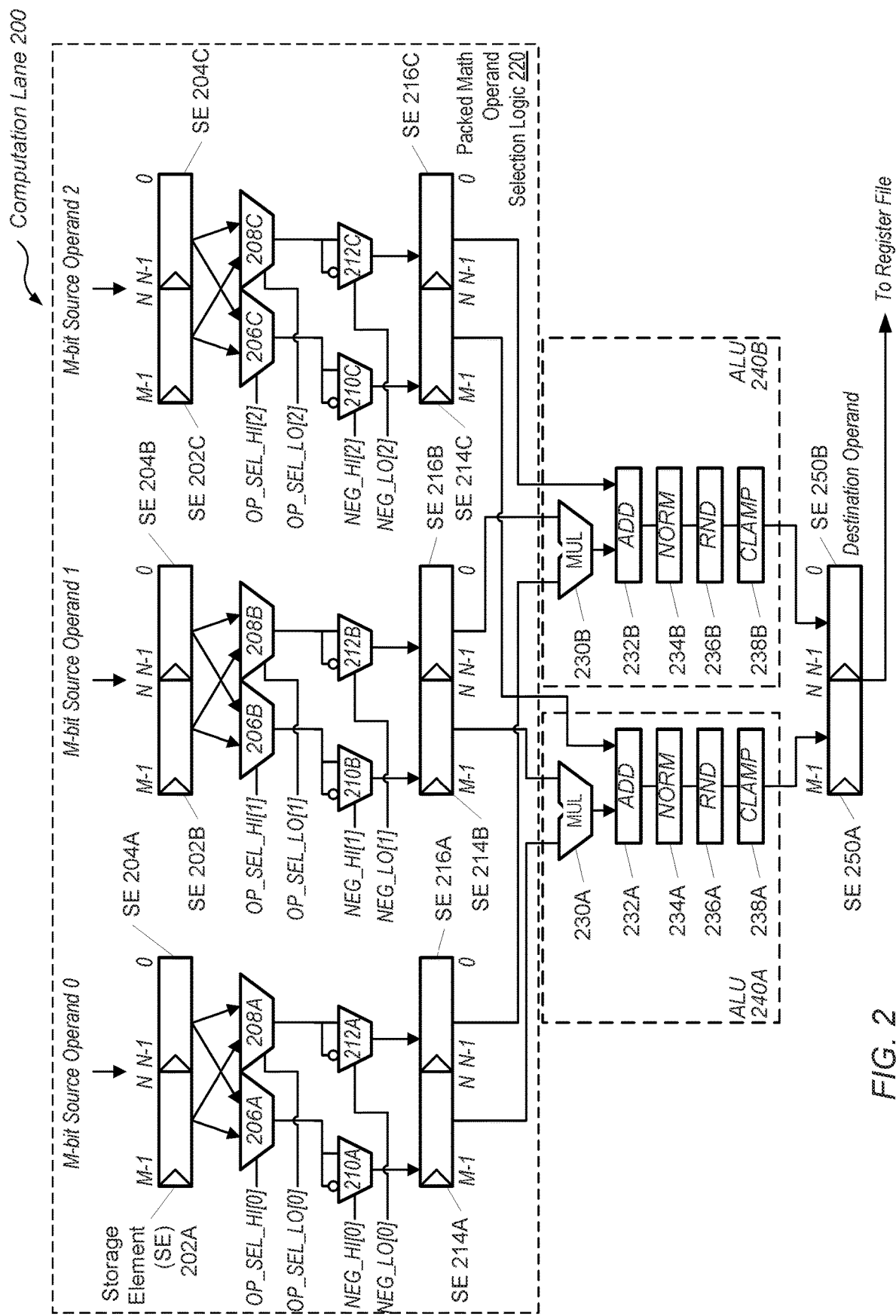
FIG. 2 is a block diagram of one embodiment of a computational lane.

Referring to FIG. 2, a generalized block diagram of one embodiment of a computation lane 200 is shown. In the illustrated embodiment, computation lane 200 includes packed math operand selection logic 220, which is also referred to as selection logic 220, and at least two ALUS 240A-240B. Selection logic 220 includes sequential elements for receiving and storing three M-bit source operands read from one of multiple sources. In other embodiments, another number of M-bit source operands are received. In an embodiment, the M-bit source operands are from one of a vector register file, a scalar register file and bypass result data from the ALUs 240A-240B.

The sequential elements used in computation lane 200 are one of a variety of flip-flop circuits and latch circuits. In an embodiment, the sequential elements 202A store a portion of the M-bit source operands labeled as Source Operand 0. In an embodiment, sequential elements 202A store the portion from bit M−1 to bit N and sequential elements 204A store the portion from bit N−1 to bit 0. In an embodiment, M is 32 and N is 16. Sequential elements 202B-202C and 204B-204C store data in a similar manner as sequential elements 202A-204A.

In various embodiments, the control signals OP_SEL_HI[2:0] and OP_SEL_LO[2:0] are from a packed math instruction. These control signals and mux gates 206A-206C determine whether the first portion or the second portion of the M-bit data operands stored in sequential elements 202A-202C and 204A-204C are selected for the first operation of the two N-bit operations performed by ALUs 240A-240B. Similarly, these control signals and mux gates 208A-208C determine whether the first portion or the second portion of the M-bit data operands stored in sequential elements 202A-202C and 204A-204C are selected for the second operation of the two N-bit operations performed by ALUs 240A-240B.

In various embodiments, the control signals NEG_HI[2:0] and NEG_LO[2:0] are also from the packed math instruction. These control signals and mux gates 210A-210C determine whether a positive value or a negative value of the selected N-bit source operand is selected for the first operation of the two N-bit operations performed by ALUs 240A-240B. These control signals and mux gates 212A-212C determine whether a positive value or a negative value of the selected N-bit source operand is selected for the second operation of the two N-bit operations performed by ALUs 240A-240B. Sequential elements 214A-214C and 216A-216C store the selected positive or negative N-bit source operands. In other embodiments, the selected positive or negative N-bit source operands are sent directly to ALUs 240A-240B.

As shown, each of ALUs 240A-240B include a variety of execution units. In the illustrated embodiment, ALU includes a multiplier 230A, an adder 232A, a norm functional unit 234A, a rounding functional unit 236A and a clamping unit 238A. These execution units are used in data processing of vector data representing multiple dimensions of space. In other embodiments, one or more additional execution units are included such as a divider, a square root function, one or more comparators and so forth. Sequential elements 250A-250B store the result data before the result data is sent to a register file for storage. In other embodiments, the result data is sent directly to the register file without staging sequential elements.

Selection logic 220 supports the processing of packed math instructions by ALUs 240A-240B. Additionally, selection logic 220 supports the processing of repacking instructions and mixed precision instructions. Repacking instructions group at least two N-bit source operands together, each from a separate M-bit source operands stored in the register file, and stores them together in a same register in the register file. By selecting from either a high portion or a low portion of one of the at least two M-bit source operands read from the register file, selection logic 220 supports mixed precision instructions to be processed without additional conversion instructions being used.

Figure 3:
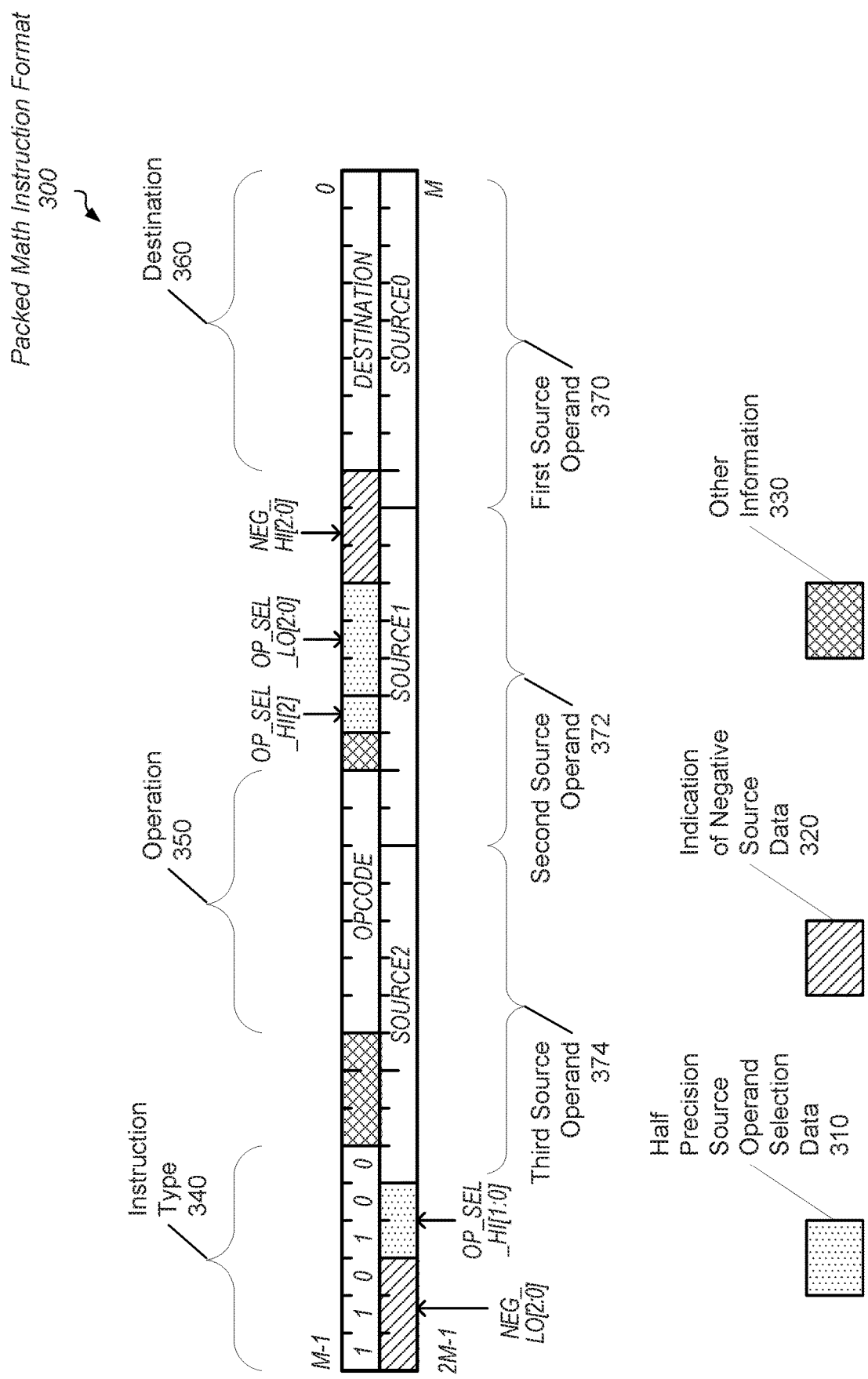
FIG. 3 is a block diagram of one embodiment of a packed instruction format.

Turning now to FIG. 3, a generalized block diagram of one embodiment of a packed math instruction format 300 is shown. As shown, instruction format 300 includes multiple fields, each with one or more bits for indicating information to the processor for processing. The field for an instruction type 340, which indicates the instruction is a packed math instruction. The field for an operation 350 includes an opcode, which indicates which one of a variety of mathematical operations to perform. The field for a destination 360 includes a register identifier for selecting which register in the register file to write with result data. The fields 370-374 include register identifiers for selecting which M-bit registers in the register file to read for M-bit source data operands. In one embodiment, instruction format 300 uses 2M bits to indicate a single packed math instruction, which indicates two N-bit operations are executed as if they were separate threads.

Instruction format 300 also includes selection data, such as half precision source operand selection data 310. The data 310 is used to select an N-bit segment of one of the three M-bit data operands indicated by one of fields 370-374. In various embodiments, the segment within the M-bit data operands is either a high portion or a low portion of the M-bit data operand. As described earlier, when M is 32 and N is 16, the selected 16-bit source operands are from either a high half or a low half of one of the 32-bit data operands indicated by one of fields 370-374.

Instruction format 300 also includes an indication of negative source data 320 for indicating whether a positive value or a negative value of the selected N-bit source operand is used for the operation indicated by the opcode in field 350. In an embodiment, the packed math instruction uses floating-point negation. In an embodiment, instruction format 300 includes other information 430. In some embodiments, instruction format 300 includes information indicating one or more of an absolute value for one or more source operands, indicating a different type for the output data representation, and an indication to clamp. The clamp information is used to determine whether compare instructions signal an exception when either of the inputs is NaN (not a number) or to clamp the result to a particular value based on whether the operation is an integer operation or a floating-point operation.

Figure 4:
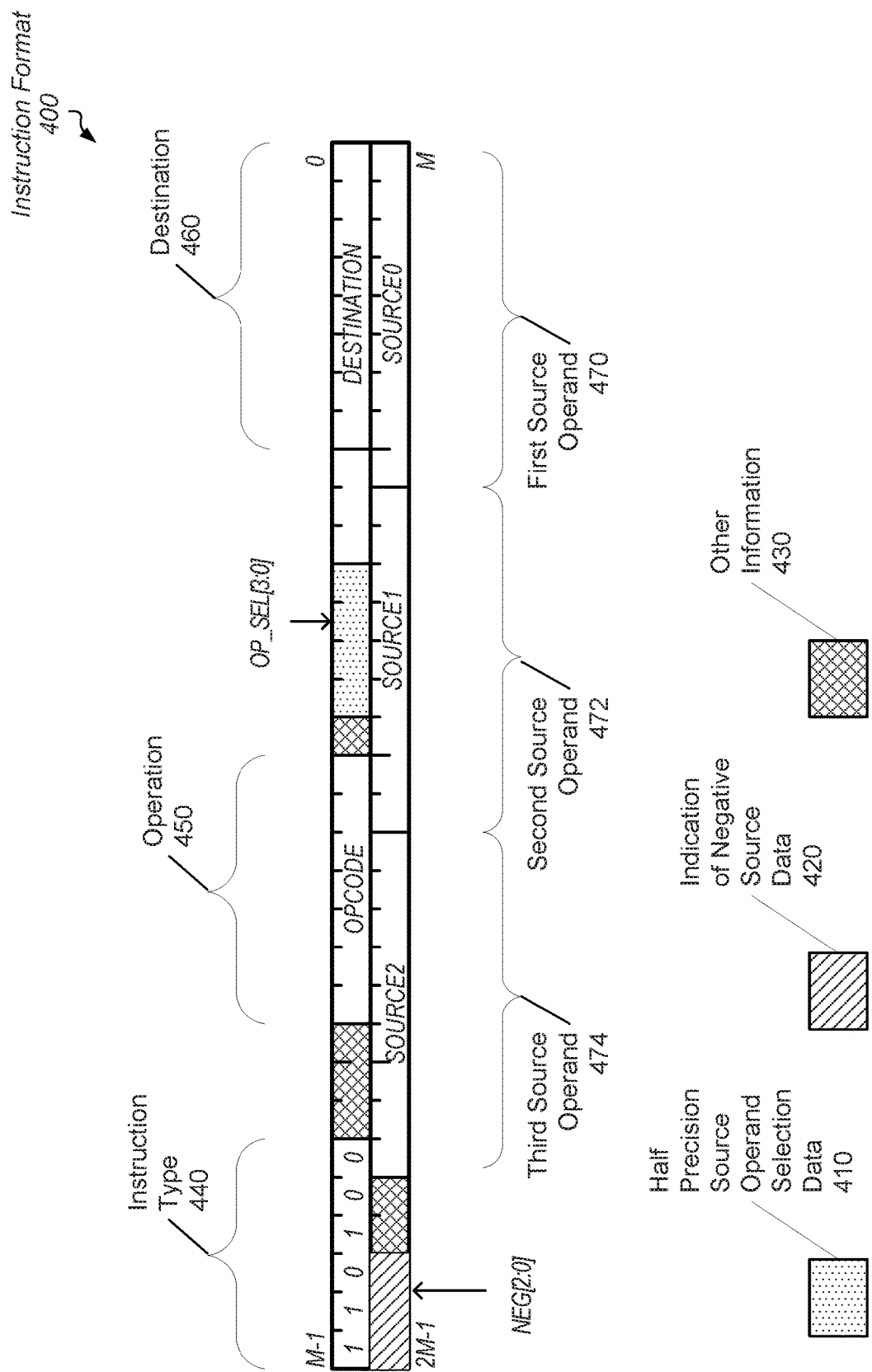
FIG. 4 is a block diagram of another embodiment of an instruction format.

Referring to FIG. 4, a generalized block diagram of another embodiment of an instruction format 400 is shown. In one embodiment, instruction format 400 uses 2M bits. As shown, instruction format 400 includes multiple fields, each with one or more bits for indicating information to the processor for processing. The field for an instruction type 440, which indicates the instruction has flexible access of N-bit source operands from the M-bit operands read from the register file. The field for an operation 450 includes an opcode, which indicates which one of a variety of mathematical operations to perform. The field for a destination 460 includes a register identifier for selecting which register in the register file to write with result data. The fields 470-474 include register identifiers for selecting which M-bit registers in the register file to read for M-bit source data operands.

Instruction format 400 also includes selection data, such as half precision source operand selection data 410. The data 410 is used to select an N-bit segment of one of the three M-bit data operands indicated by one of fields 470-474. In various embodiments, the segment within the M-bit data operands is either a high portion or a low portion of the M-bit data operand. As described earlier, when M is 32 and N is 16, the selected 16-bit source operands are from either a high half or a low half of one of the 32-bit data operands indicated by one of fields 470-474. In addition, the data 410 is used to determine where to put result data in the destination register in the register file and pointed to by the identifier stored in field 460.

In one embodiment, M is 32, N is 16 and field 410 includes 4 bits. The value of the bit OP_SEL[3] is used to determine whether the bit range 31:16 or the bit range 15:0 of the destination register is loaded with a 16-bit result of the 16-bit operation indicated by the opcode in field 450. The value of the bit OP_SEL[2] is used to determine whether the bit range 31:16 or the bit range 15:0 of the Source2 operand identified by field 474 is used by the 16-bit operation indicated by the opcode in field 450. The values of the bits OP_SEL[1] and OP_SEL[0] are used in a similar manner as OP_SEL[2], except for the Source1 operand and the Source0 operand identified by fields 472 and 470, respectively.

Instruction format 400 also includes an indication of negative source data 420 for indicating whether a positive value or a negative value of the selected N-bit source operands are used for the 16-bit operation indicated by the opcode in field 450. In an embodiment, this 16-bit instruction uses floating-point negation. In an embodiment, instruction format 400 includes other information 430, which is similar to the other information 330 described for instruction format 300 (of FIG. 3).

Figure 5:
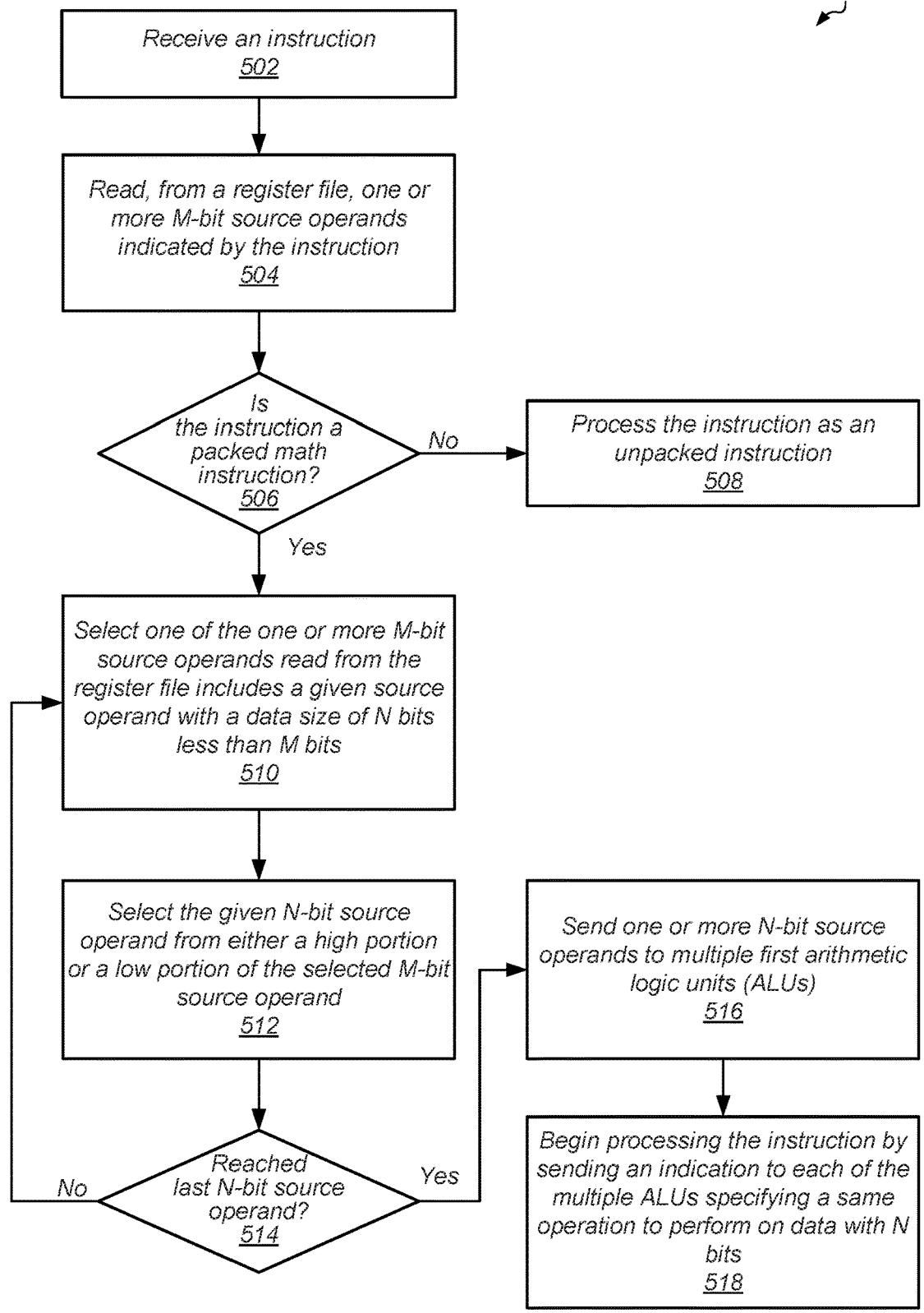
FIG. 5 is a flow diagram of one embodiment of a method for processing a packed math instruction.

Referring now to FIG. 5, one embodiment of a method 500 for processing a packed math instruction is shown. For purposes of discussion, the steps in this embodiment (as well as in FIGS. 6-7) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

An instruction is received (block 502). From a register file, one or more M-bit source operands indicated by the instruction are read (block 504). Here, the value M is a non-zero integer. In one embodiment, single precision instructions have a data size of M bits. In an embodiment, M bits is 32 bits. If the instruction is not a packed math instruction ("no" branch of the conditional block 506), then the instruction is processed as an unpacked instruction (block 508).

If the instruction is a packed math instruction ("yes" branch of the conditional block 506), then one of the one or more M-bit source operands read from the register file is selected (block 510). The selected M-bit source operand includes a given N-bit source operand, where N is less than M. In one embodiment, operand selection bits within the received instruction are used to perform the selection. The given N-bit source operand is selected from either a high portion or a low portion of the selected M-bit source operand (block 512). If the last N-bit source operand for the instruction has not been reached ("no" branch of the conditional block 514), then control flow of method 500 returns to block 510. However, if the last N-bit source operand for the instruction has been reached ("yes" branch of the conditional block 514), then one or more N-bit source operands are sent to multiple arithmetic logic units (ALUs) (block 516). Processing of the instruction is begun by sending an indication to each of the multiple ALUs specifying a same operation to perform on data with N bits (block 518).

Figure 6:
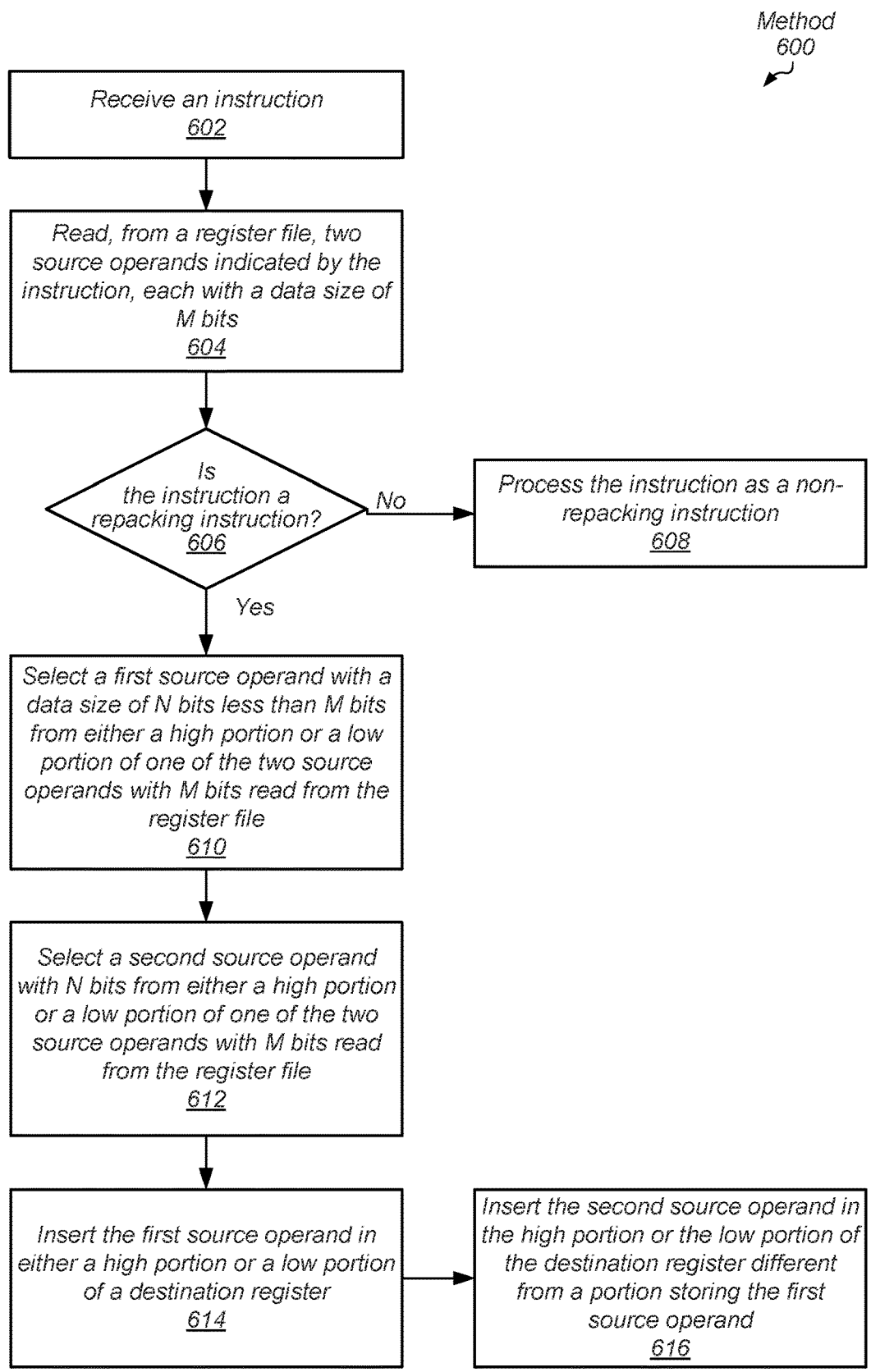
FIG. 6 is a flow diagram of one embodiment of a method for processing a repacking instruction.

Referring now to FIG. 6, one embodiment of a method 600 for processing a repacking instruction is shown. An instruction is received (block 602). From a register file, two source operands indicated by the instruction are read (block 604). Each of the two source operands have a data size of M bits. Here, M is a non-zero integer. In one embodiment, single precision instructions have a data size of M bits. In an embodiment, M bits is 32 bits. If the instruction is not a repacking math instruction ("no" branch of the conditional block 606), then the instruction is processed as an instruction other than a repacking instruction (block 608).

If the instruction is a repacking instruction ("yes" branch of the conditional block 606), then a first source operand with a data size of N bits is selected from either a high portion or a low portion of one of the two source operands with M bits read from the register file (block 610). A second source operand with N bits is selected from either a high portion or a low portion of one of the two source operands with M bits read from the register file (block 612). The first source operand is inserted in either a high portion or a low portion of a destination register (block 614). The second source operand is inserted in the high portion or the low portion of the destination register different from a portion storing the first source operand (block 616).

In an embodiment, the repacking instruction is used to pack two half precision operands together and uses an instruction format similar to instruction format 400. In an embodiment, M is 32 and N is 16. When the repacking instruction receives two 32-bit vector operands, the bit range 31:16 of the destination register receives either the bit range 31:16 or 15:0 of one of the two vector operands. Similarly, the bit range 15:0 of the destination register receives either the bit range 31:16 or 15:0 of the other one of the two vector operands. In one embodiment, each of the higher portion and the lower portion of the destination register receives the lower portion of a respective one of the two 32-bit vector operands. Other combinations for repacking are possible and contemplated.

Figure 7:
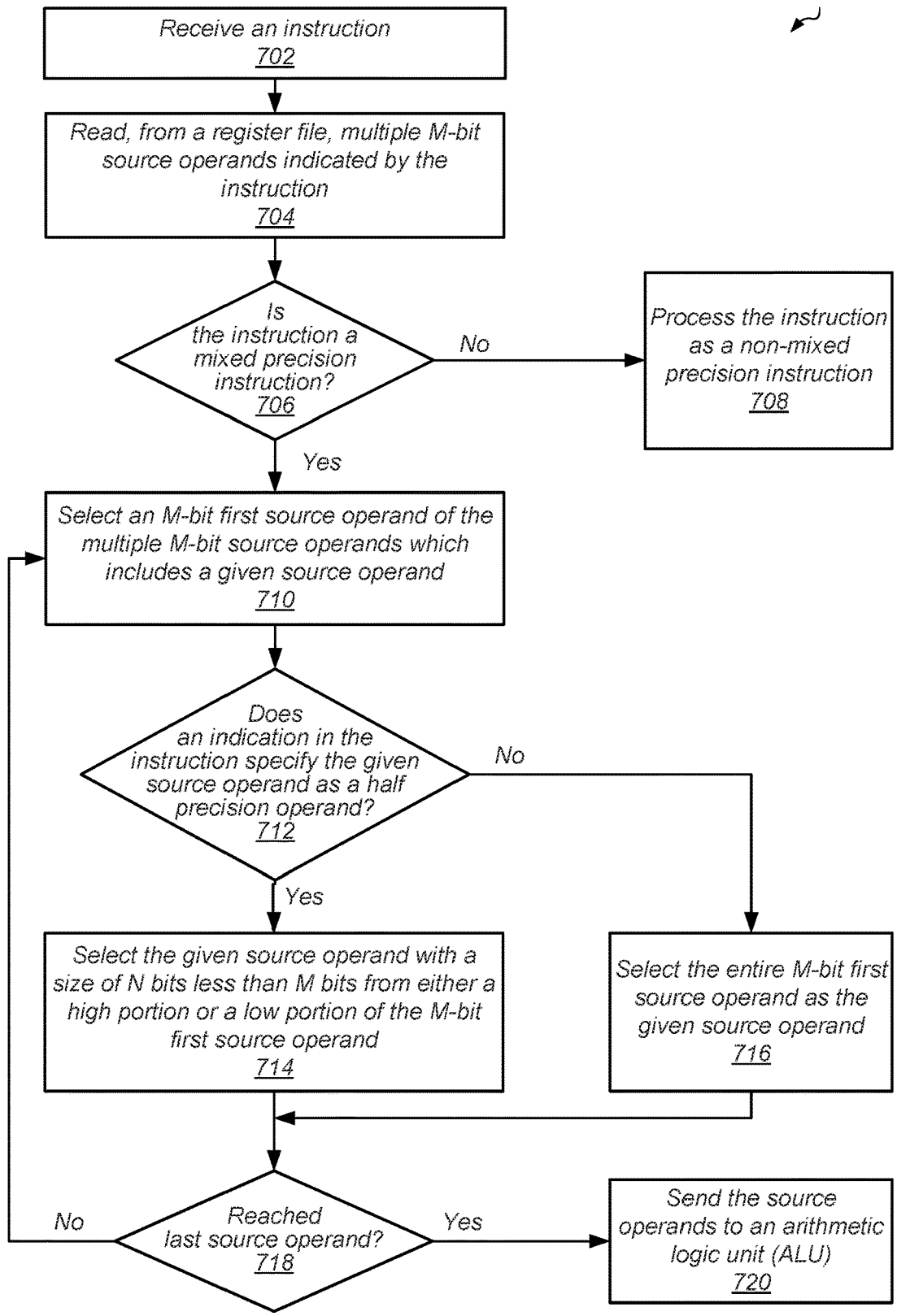
FIG. 7 is a flow diagram of one embodiment of a method for processing a mixed precision instruction.

Referring now to FIG. 7, one embodiment of a method 700 for processing a mixed precision instruction is shown. An instruction is received (block 702). From a register file, multiple source operands indicated by the instruction are read (block 704). Each of the mulitple source operands have a data size of M bits. Here, M is a non-zero integer. In one embodiment, single precision instructions have a data size of M bits and half precision instructions have a data size of N bits, where N is less than M. In an embodiment, M bits is 32 bits and N bits is 16 bits. If the instruction is not a mixed precision instruction ("no" branch of the conditional block 706), then the instruction is processed as an instruction other than a mixed precision instruction (block 708).

If the instruction is a mixed precision instruction ("yes" branch of the conditional block 706), then an M-bit first source operand of the multiple M-bit source operands is selected (block 710). The M-bit source operand includes a given source operand. In one embodiment, operand selection bits within the received instruction are used to perform the selection. If an indication in the instruction specifies the given source operand as a half precision operand ("yes" branch of the conditional block 712), then the given source operand with a size of N bits is selected from either a high portion or a low portion of the M-bit first source operand (block 714). Otherwise, if an indication in the instruction specifies the given source operand as a single precision operand ("no" branch of the conditional block 712), then the entire M-bit first source operand is selected as the given source operand with M bits (block 716).

If the last source operand for the instruction has not been reached ("no" branch of the conditional block 718), then control flow of method 700 returns to block 710. However, if the last source operand for the instruction has been reached ("yes" branch of the conditional block 718), then the source operands are sent to an arithmetic logic unit (ALU) (block 720) for processing of the mixed precision instruction.

Figure 8:
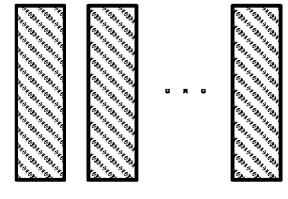
FIG. 8 is a block diagram of one embodiment of a parallel data processing unit.

Turning now to FIG. 8, one embodiment of a parallel data processing unit 800 is shown. Although an example of a single instruction multiple data (SIMD) micro-architecture is shown for the parallel data processing unit 800, other types of highly parallel data micro-architectures are possible and contemplated. As shown, the parallel data processing unit 800 uses at least a memory controller 810, a command processor 830, and compute resources 870.

The compute resources 870 includes multiple compute units 820A-820C, each with multiple lanes 822. In various embodiments, compute units 820A-820C and lanes 822 comprise the functionality of compute units 110A-110D and lanes 120A-120C (of FIG. 1) and lane 200 (of FIG. 2). Therefore, compute resources 870 is capable of processing packed math instructions, repacking instructions and mixed precision instructions without additional conversion instructions. In various embodiments, each of the lanes 822 includes a respective register file such as a vector register file. For example, each of the lanes 822 may access a respective vector register file and a shared scalar register file as described earlier for the compute resources 100 (of FIG. 1).

As shown, each of the compute units 820A-820C also includes a respective local data store 826 and a local cache memory 828. In some embodiments, each of the register files in lanes 822 stores data accessed from one of the respective local data store 826 and the local cache memory 828. In some embodiments, the local data store 826 is shared among the lanes 822 within each of the compute units 820A-820C. In other embodiments, a local data store is shared among the compute units 820A-820C. Therefore, it is possible for one or more of lanes 822 within the compute unit 820A to share result data with one or more lanes 822 within the compute unit 820B based on an operating mode.

In various embodiments, the data flow within each of the lanes 822 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. In some embodiments, each of the computation units within a given row across the lanes 822 is the same computation unit. Each of these computation units operates on a same instruction, but different data associated with a different thread.

Each of the compute units 820A-820C accesses the cache 840 for instructions. In addition, the cache 840 stores operand data to load into lane-local vector register files and shared scalar register files. In some embodiments, an operating system (OS) scheduler or a user-level scheduler schedules workloads on the parallel data processing unit 800 using a variety of schemes such as a round-robin scheme, a priority scheme, an availability scheme or a combination. Alternatively, a programmer schedules the workloads in combination with the runtime system. In such a case, the programmer utilizes a software platform to perform the scheduling. In some embodiments, the OpenCL, OpenGL and OpenGL ES platforms are used to provide low-level application programming interfaces (APIs) for translating high-level function calls to commands specific to the hardware of the GPU being used.

In one example, the OpenCL platform defines execution queues and each queue is associated with an OpenCL device. An OpenCL device is either a general-purpose central processing unit (CPU) or a GPU. Function calls are referred to as OpenCL compute kernels, or simply "compute kernels". A software programmer schedules the compute kernels in the execution queues. A compute kernel is matched with one or more records of data to produce one or more work items of computation. Each work item has a unique identifier (ID). Each of the compute units 820A-820C is assigned one of the many work items by the OS or by the software programmer. Each of the lanes 822 within a given one of the compute units 820A-820C is assigned a thread within the assigned work item.

Function calls within the application are translated to commands by a given application programming interface (API). The translated commands are sent to memory such as memory 810. In some embodiments, the command processor 830 is used as a controller for scheduling the received command groups onto the compute resources 870. In various embodiments, the command processor 830 schedules commands to the compute resources 170 based on state information. Examples of the state information are a process identifier (ID), a protected/unprotected mode/state, a compute or graphics type of work, and so on. The command processor 830 takes steps to also protect the sensitive information stored in at least a portion of local storage.

Figure 9:
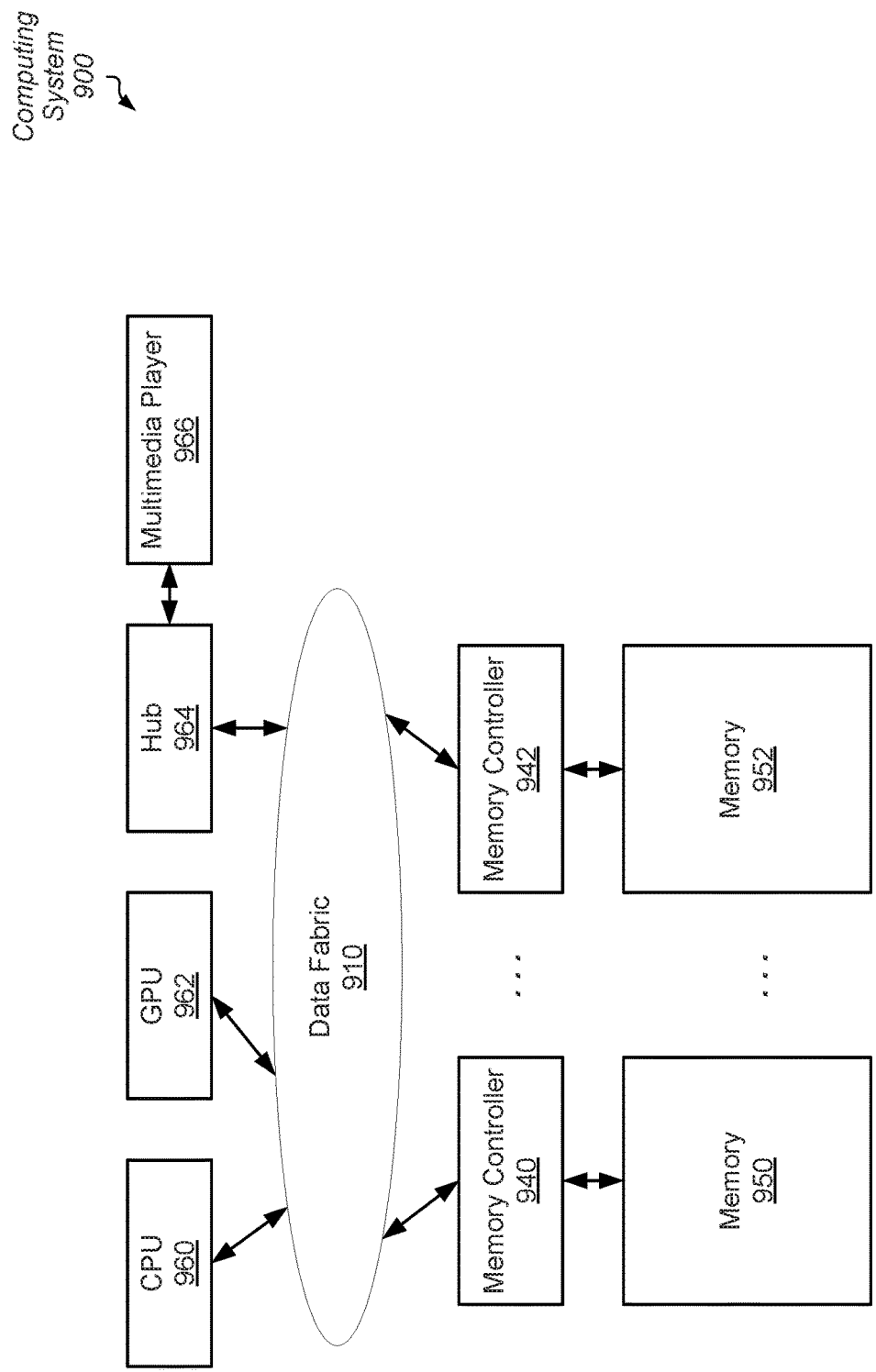
FIG. 9 is a block diagram of one embodiment of a computing system.

Referring now to FIG. 9, a generalized block diagram of one embodiment of a computing system 900 is shown. The computing system 900 includes communication fabric 910 between each of memory controllers 940 and 942 and clients such as central processing unit (CPU) 960, graphics processing unit (GPU) 962 and Hub 964. Hub 964 is used for communicating with Multimedia Player 966. In various embodiments, compute units and lanes within GPU 962 comprise the functionality of compute units 110A-110D and lanes 120A-120C (of FIG. 1) and lane 200 (of FIG. 2). Therefore, the compute resources within GPU 962 are capable of processing packed math instructions, repacking instructions and mixed precision instructions without additional conversion instructions.

In some embodiments, the components of computing system 900 are individual dies on an integrated circuit (IC), such as a system-on-a-chip (SOC). In other embodiments, the components are individual dies in a system-in-package (SiP) or a multi-chip module (MCM). The CPU 960, GPU 962 and Multimedia Player 966 are examples of clients capable of generating memory access requests. Memory controllers 940 and 942 are used for interfacing with memories 950 and 952. Memories 950 and 952 use any one of a variety of DRAM implementations.

In various embodiments, fabric 910 transfers traffic back and forth between CPU 960, GPU 962 and Hub 964 and memory controllers 940-942 and includes interfaces for supporting respective communication protocols. In some embodiments, fabric 910 includes at least queues for storing requests and responses, selection logic for arbitrating between received requests before sending requests across an internal network, and logic for building and decoding packets.

In some embodiments, the address space of the computing system 900 is divided among at least CPU 960, GPU 962 and Hub 964 and one or more other components such as input/output peripheral devices (not shown). Memory maps are maintained for determining which addresses are mapped to which component, and hence to which one of CPU 960, GPU 962 and Hub 964 a memory request for a particular address should be routed.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a register file configured to store data;
a plurality of arithmetic logic units (ALUs); and
circuitry configured to:
  receive a first instruction;
  read, from the register file, an M-bit source operand indicated by the first instruction, the M-bit source operand comprising a plurality of N-bit source operands;
  in response to the first instruction comprising a packed math operation, execute the packed math operation to perform a plurality of operations on data with a size of N bits, wherein to execute the packed math operation the circuitry is configured to:
    responsive to fewer than all of the plurality of N-bit source operands having been sent to an ALU, repeatedly send an N-bit source operand of the plurality of N-bit source operands to an ALU of the plurality of ALUs until all of the plurality of N-bit source operands have been sent; and
    responsive to all of the plurality of N-bit source operands having been sent to an ALU of the plurality of ALUs,
    send an indication to each of the plurality of ALUs specifying a same operation to perform on data with a size of N bits.

2. The processor as recited in claim 1, wherein in response to the first instruction not comprising a packed math operation, the circuitry is configured to process the first instruction as an unpacked instruction.

3. The processor as recited in claim 1, wherein the circuitry is further configured to:

send an indication to an ALU of the plurality of ALUs to convert a first source operand to the a negative value prior to performing the packed math operation.

4. The processor as recited in claim 1, wherein:
each of a plurality of N-bit source operands needed by the packed math operation may be in any of one or more M-bit source operands; and
the circuitry is configured to send each of the plurality of N-bit source operands to a respective ALU of the plurality of ALUs.

5. The processor as recited in claim 1, wherein the first instruction includes a field comprising a plurality of bits, each of the plurality of bits indicating a location of an N-bit source operand within an M-bit source operands.

6. The processor as recited in claim 1, wherein the circuitry is further configured to:
receive a second instruction;
read, from the register file, at least two M bit source operands indicated by the second instruction;
in response to the second instruction comprising a repacking operation:
insert a second N bit source operand from one of the at least two M bit source operands in a first portion of a destination register; and
insert a third N bit source operand from one of the at least two M bit source operands in a second portion of the destination register different from the first portion.

7. The processor as recited in claim 1, wherein the plurality of operations comprise is a vector floating-point operation.

8. The processor as recited in claim 1, wherein the circuitry is further configured to:
receive a third instruction;
read, from the register file, at least two M bit source operands indicated by the third instruction; and
in response to the third instruction comprising a mixed precision operation that uses an N bit half precision operand:
send the N bit half precision operand to one of the plurality of ALUs.

9. The processor as recited in claim 8, wherein in response to the third instruction comprising a mixed precision operation that uses an M bit single precision operand, the circuitry is further configured to:
send the M bit single precision operand to one of the plurality of ALUs.

10. A method, comprising:
storing data in a register file;
receiving a first instruction;
reading, from the register file, one or more M-bit source operands indicated by the first instruction, the M-bit source operand comprising a plurality of N-bit source operands;
in response to the first instruction comprising a packed math operation, executing the packed math operation to perform two separate operations on data with a size of N bits, where N and M are integers and N is less than M, said executing comprising:
responsive to fewer than all of the plurality of N-bit source operands having been sent to an ALU of a plurality of ALUs, repeatedly send an N-bit source operand of the plurality of N-bit source operands to an ALU of the plurality of ALUs until all of the plurality of N-bit source operands have been sent; and
responsive to all of the plurality of N-bit source operands having been sent:

sending an indication to each of the plurality of ALUs specifying a same operation to perform on the data with a size of N bits.

11. The method as recited in claim 10, wherein in response to the first instruction not comprising a packed math operation, the method further comprises processing the first instruction as an unpacked instruction.

12. The method as recited in claim 10, further comprising:
sending an indication to an ALU of the plurality of ALUs to convert a first source operand to a negative value prior to performing the packed math operation.

13. The method as recited in claim 10, wherein:
each of a plurality of N-bit source operands needed by the packed math operation may be in any of the one or more M-bit source operands; and
sending each of the plurality of N-bit source operands to a respective ALU of the plurality of ALUs.

14. The method as recited in claim 13, wherein the plurality of ALUs include one or more of a plurality of execution units, the plurality of execution units including one or more a multiplier, an adder, a norm functional unit, a rounding functional unit, a clamping unit, a divider, a square root function, or a comparator.

15. The method as recited in claim 10, further comprising:
receiving a second instruction;
reading, from the register file, at least two M bit source operands indicated by the second instruction;
in response to the second instruction comprising a repacking operation:
inserting a second N bit source operand from one of the at least two M bit source operands in a first portion of a destination register; and
inserting a third N bit source operand from one of the at least two M bit source operands in a second portion of the destination register different from the first portion.

16. The method as recited in claim 10, further comprising:
receiving a third instruction;
reading, from the register file, at least two M bit source operands indicated by the third instruction; and
in response to the third instruction comprising a mixed precision operation that uses an N bit half precision operand:
sending the N bit half precision operand to one of the plurality of ALUs.

17. A system for performing arithmetic operations, the system comprising:
a processor comprising circuitry; and
a non-transitory computer readable storage medium comprising program instructions operable to process half-precision operations, wherein the program instructions when executed by the processor cause the system to:
store data in a register file;
read, from the register file, one or more M-bit source operands indicated by a first instruction;
in response to the first instruction comprising a packed math operation, executing the packed math operation to perform two separate operations on data with a size of N bits, where N and M are integers and N is less than M, said executing comprising:
select an M-bit source operand of the one or more M-bit source operands, the M-bit source operand comprising a plurality of N-bit source operands;
responsive to fewer than all of the plurality of N-bit source operands having been sent to an ALU of a plurality of ALUs, repeatedly send an N-bit source operand of the plurality of N-bit source operands to an ALU of the plurality of ALUs until all of the plurality of N-bit source operands have been sent; and responsive to all of the plurality of N-bit source operands having been sent to an ALU of the plurality of ALUs,
send an indication to each of the plurality of ALUs specifying a same operation to perform on data with a size of N bits.

18. The system as recited in claim 17, wherein the program instructions when executed by the processor cause the system to:
select each of a plurality of N-bit source operands needed by the packed math operation from any of the one or more M-bit source operands; and
send each of a plurality of N-bit source operands to one of the plurality of ALUs.

19. The system as recited in claim 17, wherein the program instructions when executed by the processor cause the system to:
receive a second instruction;
read, from the register file, at least two M bit source operands indicated by the second instruction;
in response to the second instruction comprising a repacking operation:
insert a second N bit source operand from one of the at least two M bit source operands in a first portion of a destination register; and
insert a third N bit source operand from one of the at least two M bit source operands in second portion of the destination register different from the first portion.

20. The system as recited in claim 17, wherein the program instructions when executed by the processor cause the system to:
receive a third instruction;
read, from the register file, at least two M bit source operands indicated by the third instruction; and
in response to the third instruction comprising a mixed precision operation that uses an N bit half precision operand,
send the N bit half precision operand to one of the plurality of ALUs.

\* \* \* \* \*

UNITED STATES PATENT AND TRADEMARK OFFICE
CERTIFICATE OF CORRECTION

PATENT NO. : 11,880,683 B2
APPLICATION NO. : 15/799560
DATED : January 23, 2024
INVENTOR(S) : Jiasheng Chen et al.

It is certified that error appears in the above-identified patent and that said Letters Patent is hereby corrected as shown below:

In the Claims

Column 13, Claim 3, Line 2, delete "operand to the a negative" and insert -- operand to a negative --.

Column 13, Claim 7, Line 29, delete "comprise is a vector" and insert -- comprise a vector --.

Column 14, Claim 14, Line 19, delete "one or more a multiplier" and insert -- one or more of a multiplier --.

Signed and Sealed this
Ninth Day of April, 2024

Katherine Kelly Vidal
*Director of the United States Patent and Trademark Office*